UNITED STATES PATENT OFFICE.

LEONARD M. RANDOLPH, OF NEWARK, NEW JERSEY, ASSIGNOR OF THREE-FIFTHS TO BANCROFT G. BRAINE AND LAWRENCE F. BRAINE, OF BROOKLYN, NEW YORK.

PLASTIC COMPOUND AND METHOD OF MANUFACTURING SAME.

SPECIFICATION forming part of Letters Patent No. 698,856, dated April 29, 1902.

Application filed September 5, 1901. Serial No. 74,444. (No specimens.)

*To all whom it may concern:*

Be it known that I, LEONARD M. RANDOLPH, a citizen of the United States, residing at Newark, in the county of Essex and State of New Jersey, have invented an Improvement in Plastic Compounds and Methods of Manufacturing the Same, of which the following is a specification.

Heretofore both hard and soft rubber have been employed for various uses in the arts as coverings for metal parts and as separate plates between metal parts, especially in electrical appliances. Rubber for this purpose is very expensive, is becoming more so as the natural supply therefor becomes reduced, and various compounds have been employed to take the place of rubber; and my invention relates to a new compound for such use.

In carrying out my invention I employ a waste product from the manufacture of varnish, japans, and shellac—that is, the cleanings of tanks holding such materials and known as "varnish residue" or "mud" in the trade. With this material I employ powdered peat and a material produced by grinding up old rubber and dissolving the same in naphtha. These are mixed and prepared as hereinafter described.

To a given quantity of the varnish residue I add about twenty-five per cent. of powdered peat and about twenty per cent. of the rubber material. In the method of preparing and compounding this material the varnish residue is heated hot and is then strained through cloth or other material to remove foreign substances and pieces. To this while hot is added about twenty-five per cent. of powdered peat, which materials are thoroughly mixed or stirred and rendered homogeneous. To this mixture I add about twenty per cent. of the rubber material—that is to say, the substance formed from old rubber ground up and dissolved in naphtha. These three materials are thoroughly mixed and rendered homogeneous and by the heat and mixing are made substantially one. The compound is then allowed to dry out, is broken up and ground to a fine consistency for use, and may then be molded when hot and in suitable molds or dies into any desired form. This material is an efficient and cheap substitute for rubber, both as a covering for metal parts and as an intervening sheet between metal parts or a base to which the metal parts are attached. This material is also adapted for other uses in the arts and manufactures—such, for instance, as washers for plumbing appliances or packings for engines or the like—and said material may be turned, smoothed, and polished and may be pressed to such forms as golf-balls.

I claim as my invention—

1. The plastic compound herein described, composed of a waste product from the manufacture of varnish, japans and shellac and known as varnish residue, powdered peat and old rubber material, substantially as set forth.

2. The plastic compound herein described and composed of waste product from the manufacture of varnish, japans and shellacs and known as varnish residue, about twenty-five per cent. of powdered peat and about twenty per cent. of old rubber material, substantially as set forth.

3. The method of manufacturing the plastic compound herein specified, consisting in taking a given quantity of a waste product from the manufacture of varnish, japans and shellac, and known as varnish residue, heating the same hot and straining the same through a cloth or similar material for the removal of foreign substances, adding thereto in a heated condition a given quantity of powdered peat, stirring or mixing the same into a homogeneous mass, adding thereto a given quantity of old rubber material dissolved in naphtha, allowing the said composition to dry out, then breaking up and grinding the same to a fine consistency for after use in heating and molding to form, substantially as set forth.

Signed by me this 22d day of August, 1901.

LEONARD M. RANDOLPH.

Witnesses:
GEO. T. PINCKNEY,
S. T. HAVILAND.